July 5, 1966  J. Y. J. LE GRAS  3,259,286
PROCESS AND APPARATUS FOR DIVIDING GLASS
Filed Oct. 5, 1964
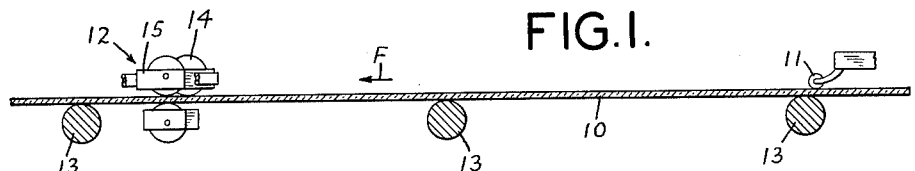
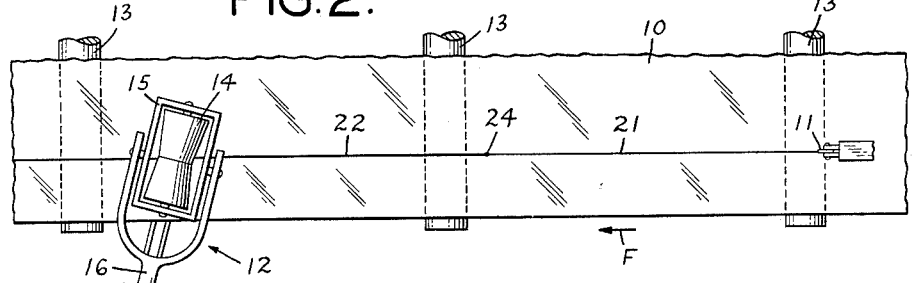
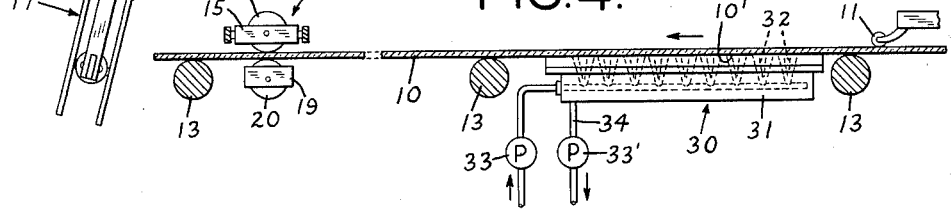
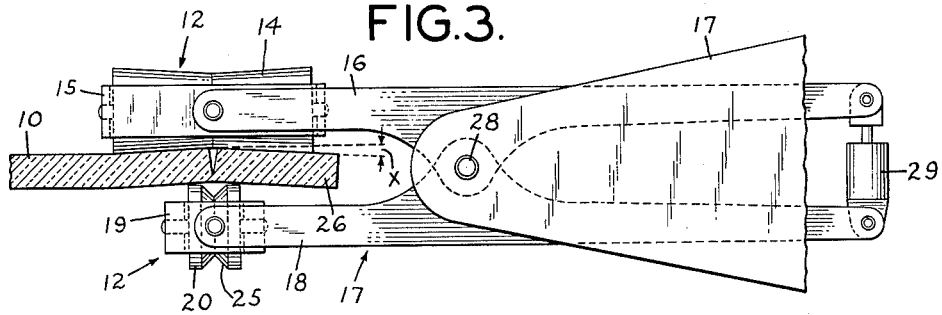
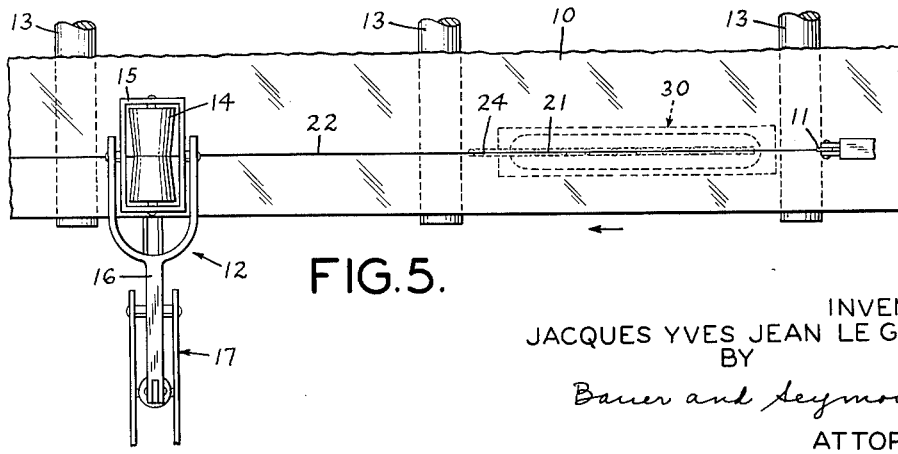
INVENTOR
JACQUES YVES JEAN LE GRAS
BY
*Bauer and Seymour*
ATTORNEYS

United States Patent Office 3,259,286
Patented July 5, 1966

3,259,286
PROCESS AND APPARATUS FOR DIVIDING
GLASS
Jacques Yves Jean Le Gras, Sartrouville, France, assignor to Compagnie de Saint-Gobain, Neuilly-sur-Seine, France
Filed Oct. 5, 1964, Ser. No. 401,589
Claims priority, application France, Oct. 25, 1963, 951,839
15 Claims. (Cl. 225—2)

This invention relates to dividing flat glass and particularly to dividing it by continuous progression. A particularly valuable use of the present invention is in removing the edges from the glass sheet as the sheet is formed in a continuous process. The edges of such sheets are generally inferior to the body of the sheet and it is customary to remove them. Their removal fixes the lateral dimensions of the sheet and is intended to give rectilinear edges, but it has not always been successful in the latter object and this has sometimes required further treatment of the edges. It is desirable that the edges of the sheet, after removal of the original edges, shall be clean, square, regular, and perpendicular to the surface of the sheet so that it will not be necessary to dress the edges to perfect them. It is an object of the invention to accomplish them.

The operation of edging as usually practiced consists in cutting away the original edges of the glass by means of a scribe which traces a line at a predetermined distance from the edge, then to bend the sheet along the line so as to open the cut in the surface through the thickness of the sheet and thus complete the division. It frequently happens that that process is not satisfactory. The edges after division are particularly fragile and in breaking produces shocks along the line of division which causes defects in the surface. This requires that the edges of the sheets must be redressed by grinding or otherwise to eliminate the faulty borders. It is also to be noted that the edges of glass sheets are usually the centers of internal compression strains which have been set up by the rapid cooling to which they have been subjected. At the moment of severance the edge strip of the band tends to be displaced outwardly and this tends to be accompanied by deflections in and a flaking off of parts of the edge face.

It is an object of the invention to eliminate such defects. Other objects are to produce a progressive severance from or division in a sheet of glass or similar vitreous material, to control the progress and the location of the break, to provide square, unchipped edges of better strength and resistance to breaking, to avoid redressing and to prevent breakage by internal strains.

The objects are accomplished generally speaking by a method of dividing flat glass progressively which comprises enscribing a line in the surface of the glass, applying a breaking force to the enscribed line at a distance from the scribe such that the breaking of the glass at the place of application of the breaking force does not progress along the line to the scribe, and progressively advancing the breaking force along the line made by the scribe as the scribe advances, and by apparatus for the progressive division of flat glass which comprises means to enscribe a line in the surface of the sheet, means to bend the glass along the enscribed line, said bending means being spaced from the scribe by a distance which prevents the break from reaching the scribe, and means to establish relative motion between the sheet on one hand and the scribe and bending means on the other.

The process according to the invention includes scoring a line in the glass by means of a diamond scribe or the like and bending the glass at a distance from the scribe on opposite parts of the score while controlling the degree of the bend so that the rupture of the glass produced by the bending does not proceed all the way to the scribe and progresses through the glass at a point which remains substantially at a constant distance from the bending means. By thus giving a limited bending to the glass along the score the angle which is made by those parts separated by the break is very small and remains constant from whence there results a clean, square break without chipping, and the risk that the edge pieces will break is minimized or wholly eliminated.

According to another characteristic of the invention a force is exercised parallel to the broad surface of the sheet at the same time that the sheet is bent which tends to prevent the detached part from moving away from the main body of the sheet. It is not necessary that the force shall be exactly parallel but it suffices if it has a component acting in that general direction.

It is another characteristic of the invention that control of the progress of the break can be achieved by energetically cooling one or more surfaces of the sheet of glass at a point not too far removed and preferably immediately after the scribe and in advance of the point of rupture. This also has the effect of reducing the tendency of the lateral strip to move away from the main body of the sheet.

The novel apparatus includes a roller which is applied beneath the sheet and the score and a roller which bears on the upper surface at points symmetrically disposed on opposite sides of the score. The points of application of the upper roller are beyond the points of application of the lower roller and this arrangement cooperates to exercise a bending force which breaks the glass. The bending force thus applied is controlled and limited by the facial contours of the rollers to an angle which limits the progress of the break to a point short of the scribe.

According to a preferred form of the invention the upper roller has the form of a grooved spool, preferably a diabolo, which consists in effect of two symmetrical conic sections joined at their small ends and having a common axis. The lower roller has a length which is less than the length of the diabolo.

The two rollers are advantageously mounted in gimbals on the ends of the jaws of pincers which can be brought together with force sufficient to bend the glass at the score upward into the diabolo until the glass breaks. This fissure then propagates itself along the score and the length of the fissure will depend upon the angle which the apex conical surfaces of the diabolo make with its axis. This angle is chosen so as to project a fissure which does not reach the scribe. The greater that angle the longer the fissure will be. Particularly desirable results are obtained with an angle between 1°30' and 10'. The fissure will open even when the angle of the diabolo is about as small as 5'. The smaller angles are advantageous because the detached strips have less tendency to break during separation.

The distance separating the scribe from the diabolo should not be so great that a lateral displacement of the sheet of glass, which sometimes occurs, will shift the score to the side of the smaller roller. A distance of about 50 cm. gives good practical results in the majority of the cases.

The mounting of the rollers on gimbals maintains their axis of rotation in parallel to the surface of the glass sheet while allowing the supporting means to be shifted in one direction or another. The supporting means are shown as pincers in the preferred form but individual mounting means could also be used. The gimbals preserve equal pressure regardless of the position of the supporting means.

The apparatus operates satisfactorily when the axis of the rollers are at right angles to the score but an advantageous result can be obtained by aligning the axis of the rollers to the score at an angle other than a right angle which is slightly oblique.

Under these conditions the diabolo exercises a force on the glass having a component perpendicular to the score which opposes the tendency of the edge to separate itself from the body of the sheet after the break has been made. This prevents scaling, chipping and the like defects in the edge of the main sheet.

It is also part of the invention to mount a cooling means between the score and the breaker in the line of the score. This has several effects, preventing the progression of the break to a location too remote from the breaker, or too close to the score, and combining its effect with the force which opposes separation of the divided parts of the glass to maintain a perfectly smooth, right angle edge. The angle of the diabolo may be adjusted to provide that the fissure ends before the zone of cooling. The cooling apparatus may be of any suitable type, always keeping in mind that the cooling means must not attack the glass or leave a deposit on its surface. This can be attained by projecting a very cold liquid (for instance 40° C. below that of the glass at the score). The liquid should have a freezing point lower than the temperature at which it was used, a high specific heat, be inert, and leave no traces as it evaporates. A 50–50 mixture of water and alcohol serves well.

The breaker can be made of any desirable material and particularly satisfactory results have been attained by using a bronze roller and a steel diabolo.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings wherein like reference characters refer to like parts throughout the several views, FIG. 1 is a diagrammatical view in vertical elevation of an apparatus according to the invention;

FIG. 2 is a plan view of FIG. 1;

FIG. 3 is an elevation of the breaker in operation;

FIG. 4 is a diagrammatical view of modified apparatus embodying a cooler; and

FIG. 5 is a plan view of FIG. 4.

In FIG. 1 the glass 10 is moving in the direction of the arrow F from the scribe 11 toward the breaker 12 on supporting rollers 13. The breaker consists of a diabolo 14 mounted in gimbals 15 on the arm 16 of pincers 17, the lower jaw 18 of which supports in gimbals 19 the breaker roller 20. The scribe 11 makes a score 21 in the upper surface of the sheet 10 and the breaker 12 separates the parts of the glass on opposite sides of the score from each other by bending the glass as shown in FIG. 3 producing a fissure 22 which progresses toward the scribe to a point 24 which lies between the breaker and the scribe. The roller 20 bends glass 10 upward into the internal angle of the diabolo as shown in FIG. 3. This roller has a circumferential, central groove 25 which is aligned with the score, permits the break to occur freely from surface to surface of the glass and supports the separated parts of the glass, after the break, at the angle $x$ provided by the surface of the diabolo. The severed strip 26 is thus prevented from attaining an angle after breakage which would cause an uncontrolled progression of the fissure toward the scribe.

The support 17 is a fixed mount of two arms joined by a pivot 28 which also serves as the pivot for the jaws 16, 18 of the pincers. Between the outer ends of these jaws and pivotally attached to both of them is a spring housing 29 containing a spring pressed piston, the strength of which is sufficient to apply breaking pressure to the diabolo and the roller. Other operating means for variable pressure may be employed such as a pneumatic cylinder and piston, if desired, a structure which is useful where a substantial change is made in the thickness of the glass being worked. The breaker exercises a double force of bending on opposite sides of the score and the glass opens along the line of the score. This bending effort is limited to a constant value and this produces a constant progression of the fissure at a substantially equal distance from the breaker.

As seen in FIG. 2 the axis of rotation of the diabolo is placed somewhat obliquely to the line of the score which produces a component which tends to close the gap between the severed edge piece and the body of the sheet.

In the modification shown in FIGS. 4 and 5 the axis of the diabolo is perpendicular to the score and the progression of the fissure is controlled by the cooler 30 which includes a trough 31 within which is a spray 32 directed upwardly against the surface of the glass and which is supplied by a pump 33. The trough 31 is in contact with the lower surface 10' of the glass and is drained by a line 34 which includes a similar pump 33'.

The cooling zone subtends a length of the score and is placed at a location beyond which it is desired that the fissure shall not pass. This cooler also has the effect of limiting the gap between the severed edge strip and the main sheet.

The advantages of the invention are in the accomplishment of those objectives which have been stated hereinabove.

It should be realized that the preferred form of the invention has been set forth but that many modifications can be employed. The shapes, sizes, and angularity of the rollers can be varied. The diabolo may be composed of two rollers angularly mounted to provide a chosen breaking angle. The length of the fissure to be controlled by diabolos of different surface angle, by modifying the shape of the lower roller, by changing the intensity of the cooling or the distance of the breaker from the cooler, bearing in mind that it is definitely undesirable that the fissure should extend above the cooler or to the scribe. The angle of the diabolo to the fissure may also be used to control the length of the fissure and these various controls may be used separately or together.

The process and the apparatus are equally useful in cutting glass sheets of any size into panels of any width. The sheet may be held fixed while the scribe and the breaker move over the sheet or the sheet may be moving while the scribe and the breaker remain in fixed position. The general principle is that there shall be relative motion between the scribe and the breaker on one hand and the sheet on the other.

As many apparently widely different embodiments of the present invention may be made without departing from the spirit and scope thereof, it is to be understood that the invention is not limited to the specific embodiments.

What is claimed is:

1. A method of dividing sheet glass progressively along a desired line, which comprises enscribing a line in one surface of the glass, applying a breaking force to the glass on opposite sides of the enscribed line and at a distance from the point of initiation of the scribed line such that the breaking of the glass at the place of application of the breaking force progresses along the line a part of the way only to said point, progressively and simultaneously advancing the breaking force and point of initiation relatively to the glass along the desired line, and controlling the advance of the break along the line by positively limiting the angular relation between the broken parts of the glass at opposite sides of the scribed line.

2. A method according to claim 1 which includes the additional step of applying force to the glass urging the broken parts thereof together adjacent the point of severance.

3. A method according to claim 1 which comprises the additional step of rapidly cooling the glass between the point of initiation of the scribed line and the place of application of the breaking force to thereby control the place of initiation of the break along the scribed line.

4. Apparatus for the progressive division of sheet glass which comprises scriber means to enscribe a line in the surface of the sheet, means to bend the glass about the enscribed line while positively limiting to a small value the angle which the severed sheet portions upon opposite sides of the line, make with one another in a plane normal to said line, said bending means being spaced along said enscribed line from said scriber means, said bending means positively causing initiation of severance at a point on said line short of said scriber means, thereby preventing the break from reaching the scribe, and means to effect relative motion between the sheet on one hand and the scribe and bending means on the other.

5. Apparatus according to claim 4 and means to cool the glass between the scribe and the bending means to further control the point of initiation of the break, between said scriber means and said bending means.

6. Apparatus for the progressive division of sheet glass which has in its surface an enscribed line, which comprises means to apply breaking force to the glass along the enscribed line including rotary glass-bending means comprising a first roller having two coaxial conical sections with their smaller ends contiguous, said roller contacting the scribed surface of the glass with said sections on respectively opposite sides of the scored line therein, to collaborate to break the glass and to arrest the broken parts at the apex angle of said sections, and means to impart relative motion to the glass and bending means whereby the bending means progresses along the enscribed line.

7. The apparatus of claim 6, a second roller positioned to contact the glass on its surface opposite said scribed surface and opposite the juncture between the conical sections of said first roller, and means urging said first and second rollers together with selectively variable force.

8. The apparatus of claim 7, said last-named means comprising first and second levers each journaling at its free end, a respective one of said rollers, means pivoting said levers together, and yielding means effective on said levers to urge said first and second rollers together into contact with respective surfaces of the sheet of glass.

9. The apparatus of claim 8, and first and second gimbal means, each said gimbal means mounting a respective one of said rollers at the end of a respective one of said first and second levers for angular movement about respective axes parallel with the sheet and normal to the axes of rotation of the rollers, through the midpoint thereof.

10. Apparatus for the progressive division of sheet glass having a line scribed in one surface thereof, first and second gimbal-mounted rollers, said first roller comprising two frusto-conical coaxial sections with their smaller and equally-sized ends contiguous, said second roller being of shorter length than said first roller, first gimbal means journaling said first roller to contact the scribed surface of the sheet with its said sections on respectively opposite sides of the scored line therein, second gimbal means journaling said second roller to contact the sheet on the face thereof opposite said first roller and in substantial registration with the scribed line, and means interconnecting said first and second gimbal means to urge the same and said first and second rollers together with selectively variable force in a plane normal to the scribed line.

11. The apparatus of claim 10, said first and second rollers being of steel and bronze, respectively.

12. The apparatus of claim 10 in which the shorter roller has a central groove aligned with the least diameter of the first roller.

13. In an apparatus for scoring and severing sheet glass along a desired line, conveyor means supporting the sheet for translation in the direction of the line, scriber means operable to scribe the sheet along the line in response to translation of the sheet, and breaker means positioned in spaced relation from said scriber means, downstream thereof, said breaker means comprising first and second rollers, said first roller comprising first and second coaxial frusto-conical sections with their equally-sized smaller ends contiguous, means journaling said first roller for contact with the scribed surface of the sheet and with its said sections on respectively opposite sides of the scribed line, means journaling said second roller for contact with the surface of the sheet opposite the scribed line and in substantial registration with said first roller, and means to press said rollers together with variable force.

14. The apparatus of claim 13, and means mounting said rollers to selectively vary the angle which their parallel axes of rotation make with the scribed line in a plane parallel to the sheet.

15. The apparatus of claim 14, and means operable to direct a stream of cooling fluid against the sheet to cool the same along the scribed line between said scriber means and said breaker means.

References Cited by the Examiner

UNITED STATES PATENTS

| | | | |
|---|---|---|---|
| 1,310,451 | 7/1919 | Shields | 225—96.5 X |
| 1,391,405 | 9/1921 | Rhonemus | 65—175 |
| 1,930,582 | 10/1933 | Burdett et al. | 225—99 X |
| 2,150,391 | 3/1939 | Morris | 225—97 |
| 2,756,545 | 7/1956 | Atkeson | 225—2 |

FOREIGN PATENTS 1,016,417 9/1957 Germany.

WILLIAM W. DYER, JR., *Primary Examiner.*

J. M. MEISTER, *Assistant Examiner.*